United States Patent [19]

Cole

[11] Patent Number: 4,683,634
[45] Date of Patent: Aug. 4, 1987

[54] METHOD OF MAKING AN INSULATED WINDOW SPACE ASSEMBLY

[76] Inventor: Richard D. Cole, 2392B Bedford Ave., Bellmore, N.Y. 11710

[21] Appl. No.: 858,577

[22] Filed: Apr. 25, 1986

Related U.S. Application Data

[60] Continuation of Ser. No. 788,691, Oct. 18, 1985, abandoned, which is a division of Ser. No. 533,575, Sep. 19, 1983, abandoned.

[51] Int. Cl.[4] .............................................. B23P 17/00
[52] U.S. Cl. ........................................ 29/412; 29/458; 29/453; 29/525; 52/172; 52/790; 312/140; 403/295; 403/402
[58] Field of Search ................. 29/412, 453, 417, 458, 29/525; 52/171, 172, 745, 790; 312/140, 257 R; 403/295, 402

[56] References Cited

U.S. PATENT DOCUMENTS

| 3,321,223 | 5/1967 | Snow et al. | 312/140 |
| 3,866,380 | 2/1975 | Benson | 403/295 |
| 3,901,572 | 8/1975 | Litchfield | 312/140 |
| 4,045,104 | 8/1977 | Peterson | 312/257 SK |
| 4,074,480 | 2/1978 | Burton | 52/172 |
| 4,099,815 | 7/1978 | Cox et al. | 403/295 |
| 4,105,348 | 8/1978 | Anderson et al. | 312/140 |
| 4,108,520 | 8/1978 | Litchfield | 312/140 |
| 4,145,150 | 3/1979 | Rafeld | 403/295 |
| 4,222,209 | 9/1980 | Peterson | 52/172 |
| 4,357,744 | 11/1982 | McKenzie et al. | 403/295 |
| 4,530,195 | 7/1985 | Leopold | 29/453 X |

FOREIGN PATENT DOCUMENTS 8302973  9/1983  European Pat. Off. ............ 403/295

Primary Examiner—Charlie T. Moon
Attorney, Agent, or Firm—Kane, Dalsimer, Kane Sullivan & Kurucz

[57] ABSTRACT

A window spacer assembly is disclosed having tubular members interconnected by corner pieces. The corner pieces are provided with flexible fingers which create an interference fit with the tubular member ends and resist forces which tend to pull the assembly apart.

12 Claims, 9 Drawing Figures

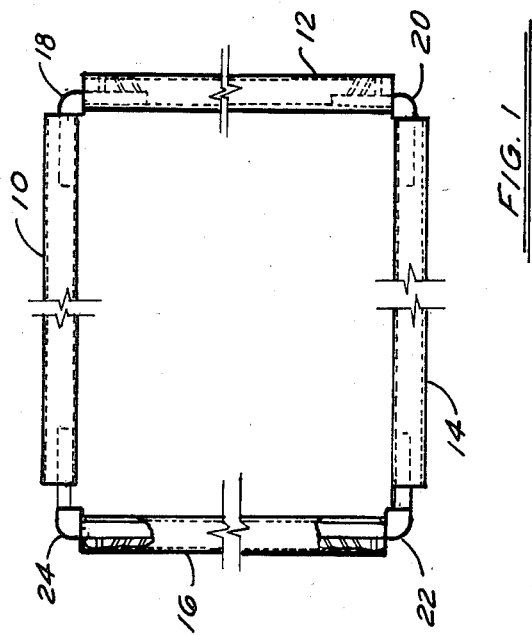
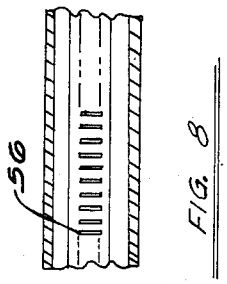
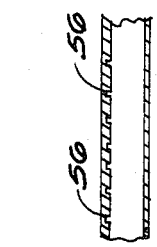
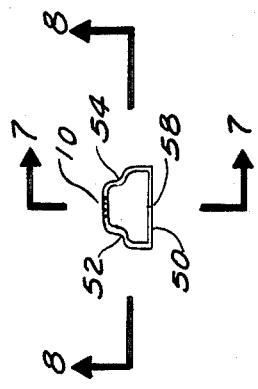

METHOD OF MAKING AN INSULATED WINDOW SPACE ASSEMBLY

This is a continuation of co-pending application Ser. No. 788,691, filed on Oct. 18, 1985, now abandoned, which is a divisional of co-pending application Ser. No. 533,575, filed on Sept. 19, 1983, now abandoned.

FIELD OF INVENTION

The present invention relates to a metal frame and more particularly to a frame assembly used as a spacer between two glass panes of an insulated window.

BACKGROUND OF THE INVENTION

The recent energy crisis brought on a public consciousness of the need for the conservation of energy. As a result the demand for all products and devices used in the building industry and which save energy increased dramatically. One such product is the insulated window. Energy conscious buyers or leasers of new commercial or residential buildings require the installation of insulated windows. Furthermore insulated windows are used whenever windows in older buildings need replacement.

Typically an insulated window comprises two or more window panes of glass or a similar transparent material separated by frame assembly. Side members are mounted around the panes to keep the panes and the frame assembly together.

The frame assembly is necessary to keep the panes parallel to each other and to insure they do not warp. If the panes are not perfectly parallel or straight they look unesthetical to the eye. Furthermore warping of the panes puts undue transversal and longitudinal strain on the panes and causes them to crack or break under the effect of normal wear and tear, temperature variations, and so forth.

Typically frame assemblies are made of tubular members placed end to end and perpendicular to each other to form a rectangle. The size of the rectangle is dictated by the size of the window panes. The members are held together by corner pieces which are adapted to hold the individual members together prior to and during the assembly of the window. These corner pieces are required to be light weight, inexpensive and relatively simple so that they do not extend into the volume defined by the panes and the frame assembly where they would be visible, and do not otherwise interfere with the assembly of the window. At the same time they must be able to hold together the frame members while the assembly is subjected to the normal manufacturing exigencies. For example semi-automated assembly lines have been used for windows in which the frame assembly was transported from one place to another by conveyor belts. It was found that with the prior corner pieces any sudden change in speed or direction of the conveyor belt caused the frame assembly to fall apart because the corner pieces did not function properly.

OBJECTIVES AND SUMMARY OF THE INVENTION

In view of the above-enumerated disadvantages of present art assembly an objective of the present invention is to provide a frame assembly having corner pieces which hold the assembly securely.

Another objective is to provide a frame assembly which is easy and inexpensive to make and put together.

Other objectives and advantages shall become apparent in the following description of the invention.

According to this invention, a window spacer assembly comprises a plurality of tubular members which are interconnected by corner pieces end to end to form a frame of a predetermined shape. The corners are provided with legs having a plurality of flexible fingers which form an interference fit with the tubular members when the said legs are inserted therein. Preferably the corners have a unitary construction and are made from a plastic material by a standard molding process.

DESCRIPTION OF THE DRAWINGS

FIG. 1 shows a frame assembly made in accordance with the present inventions;

FIG. 6 is a cross-sectional view of one of the members;

FIG. 7 is a longitudinal sectional view of the member of FIG. 6 taken along line 7—7;

FIG. 8 is another longitudinal sectional view of the member of FIG. 6 taken along line 8—8.

DESCRIPTION OF THE PREFERRED EMBODIMENT

According to the present invention, a frame assembly comprises four members 10, 12, 14 and 16 which are joined by four corner pieces 18, 20, 22 and 24 as shown in FIG. 1 to form a rectangular spacer frame. As previously explained, this frame is used to space window panes of insulated windows.

Figure 3:
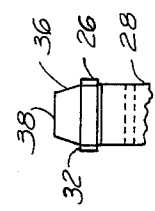
FIG. 3 shows an end view taken along line 3—3 of FIG. 2.

The details of a typical corner piece 18 are shown in FIGS. 2-5. It comprises two legs 26 and 28 which have the same length and which meet at a center portion 30. The two legs are shown as being generally perpendicular to each other, however if the frame assembly is required to have a non-rectangular shape for a special application in which case the legs may subtend any desired angle. In particular, for very large frames elements may be required to splice two members, in which case the two legs are colinear, i.e. the angle between them is 180°. Each leg 26, 28 has an outer surface 32, 34 and extending away therefrom are a plurality of fingers 36. Each finger 36 has a trapezoidal surface, as shown in FIG. 3. However this surface may also be rectangular, or other similar shapes.

Figure 2:
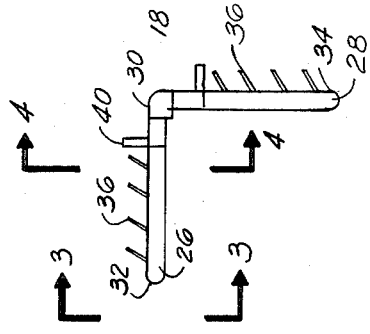
FIG. 2 shows a side view of the corner piece.
Figure 5:
FIG. 5 is an enlarged partial side view of the corner showing the profile of the fingers.
Figure 4:
FIG. 4 shows a sectional view of the corner taken along line 4—4 of FIG. 2.

The finger ends with an outer straight edge 38 which is parallel with surface 32. Each finger is preferably not perpendicular to the respective surface to which the finger is attached but rather it is angled toward center portion 30, as shown in FIG. 2. Furthermore as illustrated in FIG. 5 each finger is thicker at its base, i.e. the portion connecting it to the outer surface, than at the outer edge 38.

Optionally each leg also has a trapezoidal tab 40 mounted vertically to the respective outer surface 32, 34 adjacent to the location where the respective leg joins center portion 30. Tab 40 is generally perpendicular to its outer surface as shown.

Corner piece 18 is preferably made out of a plastic or similar material which is light and inexpensive. A further requirement is that the material cannot be too rigid to allow the fingers to flex slightly. The thicker base for the fingers causes the fingers to be more flexible toward their free tip or edge 38 while being relatively rigid at the base. The corner piece may be made through a standard molding process.

The tubular members shall now be described in conjunction with FIGS. 6–8. Each member has a relatively oval cross-section as shown in FIG. 6. At least one side of the member is flat as at 50. This side faces the inner space bounded by the window panes. Opposite the flat side two indentations 52 and 54 are provided. When the panes are placed adjacent to the spacer assembly these indentations provide space for a caulking or similar adhesive and/or insulating material. A plurality of grooves 56 are preferably provided on the inner surface of the member. Each of these grooves extends transversally and has a length equal to or greater than the length of finger tips 38. Preferably these grooves are made in the surface of the side extending between the indentations 52 and 54.

The tubular member is made of a strong, light material which resists dimensional distortions, such as aluminum. One way to make is to take a flat strip of desired material bend it into the shape shown and solder or weld the edges as at 58 by a well-known method such as by use of a laser. Before the material is bent the grooves 56 are made with a die or similar means. The grooves may be made along the whole length of each tube so formed to provide a stock item. Such a tube could be cut into any length to form any size assembly.

Alternatively the tube could be pre cut and formed to preselected length. In this case grooves need be made only at the two ends.

Figure 9:
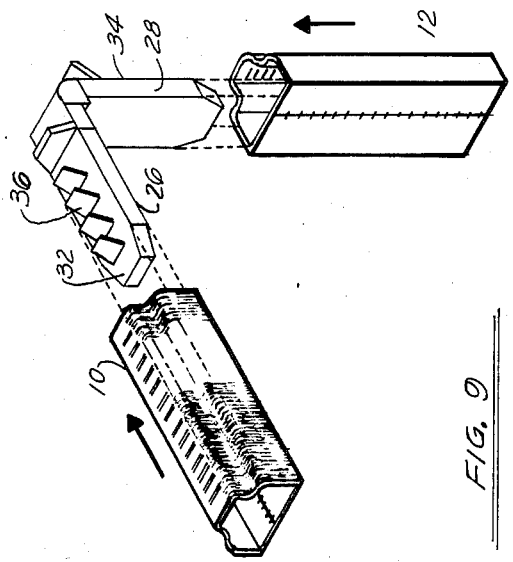
FIG. 9 shows two members of the frame assembly being joined by a corner piece.

The elements described thus far are assembled as shown in FIG. 9 by slipping the corner piece 18 into respective members 10 and 12. Members 10, 12 and the corner are dimensioned so that as each leg 26, 28 slips into the respective member 10, 12, the fingers 36 are flexed toward surface supporting them by the inner wall of the tube so that an interference fit is created between the corner piece and each member. Furthermore it should be appreciated that due to the orientation of the fingers, while it is easy to insert the corner legs into the members, it is very hard to pull them out again. This is because as one attempts to pull away the member from the corner the fingers try to flex away from their support surface and the force applied between a member and a corner becomes proportional to the force of friction between these two elements. In effect fingers 36 create a wedge between the corner pieces and the tubular elements. The above-described phenomenon is enhanced by the grooves. As the members reach their final positions at least some of the finger ends 38 enter and are engaged by grooves 56. When a force is applied to pull a member and the corner apart the interaction between the groove and the finger ends generates a counteractivity force which prevents the corner from slipping out.

Customarily, the inner spaced surrounded by the window planes is hermetically sealed to provide effective heat insulation. However if moist air seeps into this space it condenses on the window creating an undesirable aspect. Therefore a desiccant powder or other moisture absorbing material is placed into the tubular members. Tabs 40 of the corner pieces are provided an effective stopper means to prevent the material from leaking out. Preferably the area of the tab 40 should be slightly smaller than the cross-sectional area of the tubular member to allow moisture to enter the tubular member from the inner space defined above.

The above-described window assembly was found to be resistant to sudden rough handling. The corner pieces are very easy to insert into the tubular members. Furthermore all the elements of the assembly are easy to manufacture and are also inexpensive.

It is clear that one skilled in the art could perform modifications to the above-described device without departing from the scope of the invention as defined in the appended claims.

I claim:

1. A method of making an insulated window spacer assembly comprising:

forming a tubular element with a longitudinal inner flat wall having a plurality of transversal grooves;

forming a corner piece having two legs joined at a preselected angle, at least one leg having a free end and a flat surface with a plurality of flexible fingers extending outwardly therefrom and obliquely away from said free end, said fingers being spaced at a distance different than the distance separating said grooves, said leg having a cross-sectional external size exceeding a correspondingly shaped tubular element cross-sectional inside size;

cutting said tubular element transversally into tubular members of preselected lengths, independently of the positions of said grooves; and joining two of the members by said corner piece by inserting the legs into the members, whereby an interference fit is formed between the one leg and the corresponding member with some of the fingers engaging some of the grooves.

2. The method of claim 1 further comprising providing a desiccant in said tubular members.

3. The method of claim 1 wherein four members are joined by four corner pieces to form a rectangular spacer assembly.

4. The method of claim 1 wherein both legs have surfaces with fingers.

5. A method of making an insulated window spacer assembly comprising:

forming a tubular element with a longitudinal inner flat wall having a plurality of transversal grooves;

forming a corner piece having two legs joined at a preselected angle, at least one leg having a free end and a flat surface with a plurality of flexible fingers extending outwardly therefrom, said fingers being spaced at a distance different than the distance separating said grooves, said leg having a cross-sectional external size exceeding a correspondingly shaped tubular element cross-sectional inside size;

cutting said tubular element transversally into tubular members of preselected lengths, independently of the positions of said grooves; and joining two of the members by said corner piece by inserting the legs into the members, whereby an interference fit is formed between the one leg and the corresponding member with some of the fingers engaging some of the grooves to interlock same and prevent separation.

6. The method of claim 5 further comprising providing a desiccant in said tubular members.

7. The method of claim 5 wherein four members are joined by four corner pieces to form a rectangular spacer assembly.

8. The method of claim 5 wherein both legs have surfaces with fingers.

9. A method of making an insulated window spacer assembly comprising:

forming a tubular element with a longitudinal inner flat wall having a plurality of transversal grooves;

forming a corner piece having two legs joined at a preselected angle, at least one leg having a free end and a flat surface with a plurality of flexible fingers extending outwardly therefrom and said fingers being spaced at a distance different than the distance separating said grooves, said leg having a cross-sectional external size exceeding a correspondingly shaped tubular member cross-sectional inside size;

cutting said tubular element transversally into tubular members of preselected lengths, independently of the positions of said grooves; and joining two of the members by said corner piece by inserting the legs into the members with the fingers extending obliquely away from said free end, whereby an interference fit is formed between the one leg and the corresponding member with some of the fingers engaging some of the grooves.

10. The method of claim 9 further comprising providing a desiccant in said tubular members.

11. The method of claim 9 wherein four members are joined by four corner pieces to form a rectangular spacer assembly.

12. The method of claim 9 wherein both legs have surfaces with fingers.

* * * * *